United States Patent [19]

Kano

[11] Patent Number: 4,925,592
[45] Date of Patent: May 15, 1990

[54] LIQUID CRYSTAL COMPOSITION

[75] Inventor: Mitsuru Kano, Furukawa, Japan

[73] Assignee: Alps Electric Co., Ltd., Tokyo, Japan

[21] Appl. No.: 206,458

[22] Filed: Jun. 13, 1988

[30] Foreign Application Priority Data

Aug. 28, 1987 [JP] Japan ................... 62-214825

[51] Int. Cl.$^5$ ............................. C09K 19/20
[52] U.S. Cl. ............... 252/299.67; 560/103; 560/106
[58] Field of Search ............ 350/350 S; 252/299.01, 252/299.67

[56] References Cited

U.S. PATENT DOCUMENTS

| | | | |
|---|---|---|---|
| 4,556,727 | 12/1985 | Walba | 252/299.01 |
| 4,596,667 | 6/1986 | Tnukai et al. | 252/299.67 |
| 4,622,165 | 11/1986 | Kano et al. | 252/299.01 |
| 4,780,241 | 10/1988 | Furukawa et al. | 252/299.01 |

FOREIGN PATENT DOCUMENTS

| | | |
|---|---|---|
| 219481 | 4/1987 | European Pat. Off. |
| 63-175095 | 7/1988 | Japan . |
| 2181429 | 4/1987 | United Kingdom . |
| 2184116 | 6/1987 | United Kingdom . |

OTHER PUBLICATIONS

Decobert et al., Mol. Cryst. Liq. Cryst., vol. 114, pp. 237-247 (1984).

Primary Examiner—John F. Terapane
Assistant Examiner—Richard Treanor
Attorney, Agent, or Firm—Guy W. Shoup; David W. Heid

[57] ABSTRACT

A liquid crystal composition comprising at least a compound I represented by the following general formula (I) and a compound II represented by the following general formula (II):

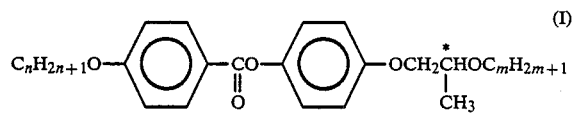

(I)

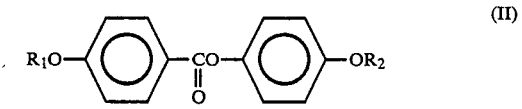

(II)

where n, m are natural numbers, $R_1$ and $R_2$ indicate alkyl group having different asymetric carbon structures on their derivatives. Thus, the lower limiting of temperature the Sc* phase of the liquid crystal composition can be reduced by adding in combination the compounds I and II to a liquid crystal composition. The mixture will exhibit an Sc* phase at the room temperature and especially at much lower temperatures.

2 Claims, 5 Drawing Sheets

LIQUID CRYSTAL COMPOSITION

BACKGROUND OF THE INVENTION

1. Field of the Invention

This invention relates to a liquid crystal composition for use in a ferrodielectric liquid crystal display element, etc.

2. Description of the Prior Art

Recently, various liquid crystal compositions which exhibit ferrodielectric property have been proposed. However, there is scarcely a liquid crystal composition which has preferable orientation and responsiveness, and a lower limiting temperature of the chiral smectic C (Sc*) phase presented at room temperature or lower.

For example, according to Goodby et al proposal, when compounds A, B, C represented by the following formulae (A), (B) and (C) are mixed, a liquid crystal composition which has preferable orientation and responsiveness can be prepared, where symbols S and R in the following formulae respectively indicate that the absolute dispositions of optical active groups of side chains are S type and R type.

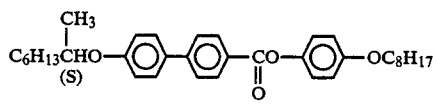
(A)

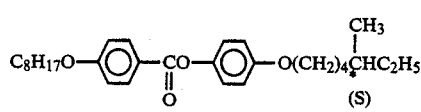
(B)

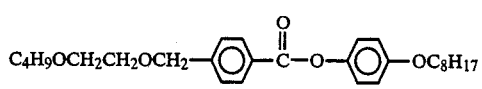
(C)

However, when the relationship between the transfer temperature and the mixture ratio of the liquid crystal composition made of these compositions A, B and C is examined, the temperature range exhibiting Sc* phase is approx. 13° to 55° C. in the best state as shown in FIG. 5. (The liquid crystal composition measured in this proposal was prepared by adding the compound C to the mixture Z mixed with the compounds A and B at the ratio of A:B =4:6 (molar ratio).)

The temperature range of the Sc* phase of a liquid crystal composition obtained by mixing liquid crystal compounds D and E represented by the following formulae (D) and (E) is approx. 20° to 65° C. in the best state as shown in FIG. 6.

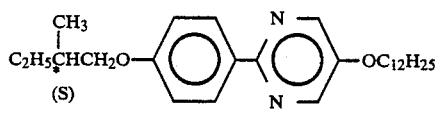
(D)

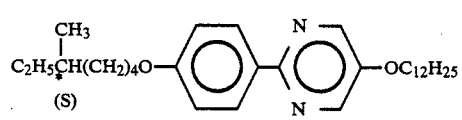
(E)

On the other hand, there is also a proposal that the temperature range of Sc* phase can be increased by mixing a compound having a different skeleton. The temperature range of Sc* phase of a composition obtained by mixing the compounds A to E according to this proposal is approx. 0 to 63° C. in the best state as shown in FIG. 7. (The liquid crystal composition measured in this proposal was prepared by adding a mixture X mixed with the compounds D and E at the ratio of D:E=8:2 (molar ratio) to the mixture Y mixed with the compounds A, B and C at the ratio of A:B:C =37:55.5:7.5 (molar ratio).)

As described above, the conventional ferrodielectric liquid crystal composition is unstable in practical use since the lower limiting temperature of the Sc* phase is not sufficiently low.

SUMMARY OF THE INVENTION

Accordingly, an object of this invention is to provide a ferrodielectric liquid crystal composition which has preferable orientation and responsiveness, and the lower limiting temperature of Sc* phase thereof presented at room temperature or lower.

In order to eliminate the above-mentioned drawbacks, there is provided according to the present invention a liquid crystal composition comprising at least a compound I represented by the following general formula (I) and a compound II represented by the following general formula (II):

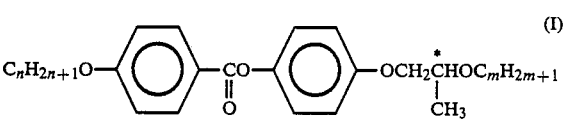
(I)

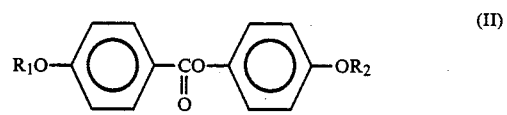
(II)

The temperature range of the Sc* phase of the liquid crystal composition can be reduced by adding in combination the compounds I and II, and the liquid crystal composition which exhibits the Sc* phase even at the room temperature or lower.

The ester compound I represented by the above general formula (I) preferably uses those having n of $1 \leq n \leq 14$, m of $1 \leq m \leq 12$.

The ester compound II represented by the formula II has, as shown in FIG. 1, optical active groups including asymetric carbon structures at both sides of its central skeleton 1 as side chains 5 and 6.

The ester compound of this structure becomes a ferrodielectric liquid crystal having large spiral pitch by the cooperation of the side chains 5 and 6 including different irregular structures.

The ester compound II is so preferably constructed that $R_1$ and $R_2$ in the formula (II) induce spiral twisting in a different direction and spontaneous polarization in the same direction as defined by of the same direction in the liquid crystal compounds represented by the following formulae (III) and (IV):

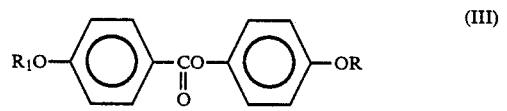
(III)

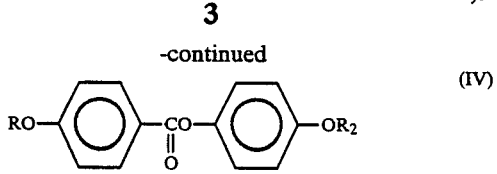

where R in the formulae (III) and (IV) indicates alkyl group having no asymetric carbon structure.

More specifically, it is known that the optical active groups for forming side chains 5 and 6 can be sorted into four types (a) to (d) as shown in Table 1 according to the relationship between the twisting direction of the spontaneous and the direction of the self polarization of the liquid crystal compounds induced by the groups (J. W. Goodby et al, J. Am. Chem. Soc., 108, 4729(1986)).

In the compound II mixed in the liquid crystal composition of the present invention, $R_1$ and $R_2$ in the formula (II) preferably use one selected from the optical active groups sorted to (a) and (b) in Table 1 or one selected from the optical active groups sorted to (c) and (d)

TABLE 1

|  | | Twisting direction of spiral | |
|---|---|---|---|
|  | | Clockwise | Counterclockwise |
| Direction of self polarization | (+) | (a) | (b) |
|  | (−) | (c) | (d) | more specifically, $R_1$ and $R_2$ for forming the ester compound of the present invention are: for $R_1$:

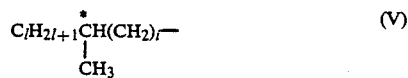

for $R_2$:

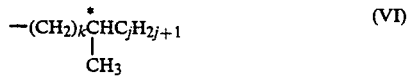

where $i \neq k$, $2 \leq l$, $j \leq 8$, and the absolute disposition of asymmetric carbons presented in $R_1$ and $R_2$ are the same.

Among them, the groups having $0 \leq i$, $i \leq 8$ are specially preferably used.

The liquid crystal compound to be mixed with the compounds I and II includes ester liquid crystal compound such as compounds A, B or pyrimidine liquid compounds, Schiff's base liquid crystal compounds, etc.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

The liquid crystal composition of the present invention will be described in detail along with embodiments with reference to the accompanying drawings. Example 1.

A compound F represented by the following formula F was used as a compound I, a compound G represented by the following formula G was used as a compound II, a liquid crystal composition made of them and the compound B was prepared, and the relationship between the mixture ratio and the transfer temperature was examined.

The liquid crystal composition was prepared by mixing the compounds F and B at a ratio of 1:1 (molar ratio), and adding the compound G to the mixture.

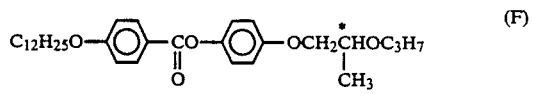

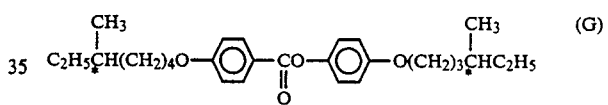

Figure 1:
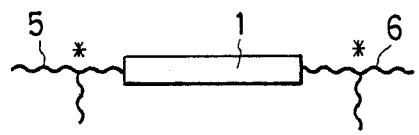
FIG. 1 is a schematic view showing a schematic structure of a compound II mixed with liquid crystal composition of the present invention.
Figure 2:
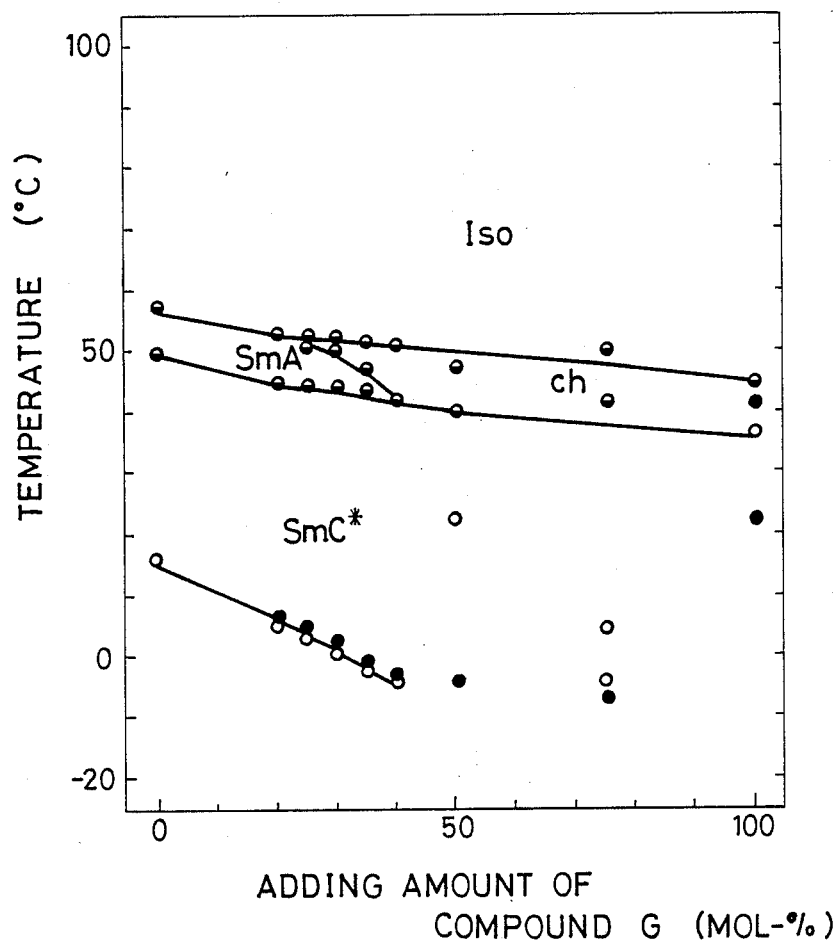
FIG. 2 is a phase diagram showing the relationship between the transfer temperature and the mixture ratio of a liquid crystal composition according to an embodiment 1 of the invention.

The results are shown in FIG. 2.

Figure 3:
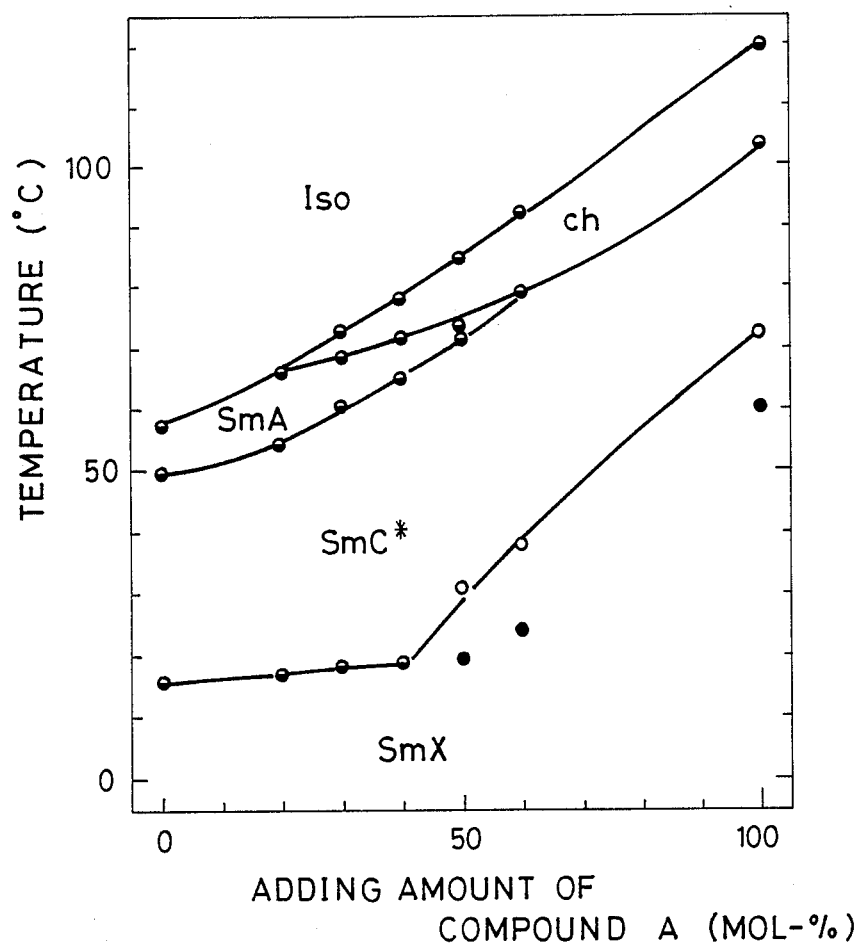
FIG. 3 is a phase diagram showing the relationship between the transfer temperature and the mixture ratio of a liquid crystal composition of a comparison example 1.

For comparison, the liquid crystal composition of embodiment 1 and a liquid crystal composition different only at a point of using the compound A instead of the compound G, i.e., a liquid crystal composition which included no compound G as a compound II were prepared, and the relationship between the mixture ratio and the transfer temperature was examined. The results are shown in FIG. 3.

In comparison of the results in FIGS. 2 with 3, in the liquid crystal composition mixed with both the compound F as the compound I and the compound G as the compound II, the temperature range of the Sc* phase in case of F:G:B=30:40:30 (molar ratio) became −5° to +42° C. On the other hand, in the liquid crystal composition of the comparison example not mixed with the compound G as the compound II, the temperature range of the Sc* phase was +17° to 54° C. in case of F:B:F =40:40:20 (molar ratio) even in the best state.

From the above result, it was understood that the lower limiting temperature of the Sc* phase of the liquid crystal composition could be reduced by adding both the compound I and the compound II.

Then, a liquid crystal composition as in Example 1 was mixed with compounds A, B, C at the ratio of A:B:C=30:40:30 was poured in a liquid crystal cell having 2 micron of thickness, and the orientation and the responsiveness were examined. The liquid crystal cell was formed by coating a glass substrate formed with a transparent electrode made of indium-tin oxide (ITO) with polyimide and rubbing it in a uniaxial direction.

When the formed liquid crystal cell was examined, the liquid crystal composition exhibits excellent orientation and bistability. Then, when an AC voltage of ±10 volts of rectangular wave was applied thereto, and the responding velocity was examined. Then, it was confirmed that high velocity responsiveness of 200 microseconds or shorter at room temperature or lower was performed.

EXAMPLE 2

Figure 4:
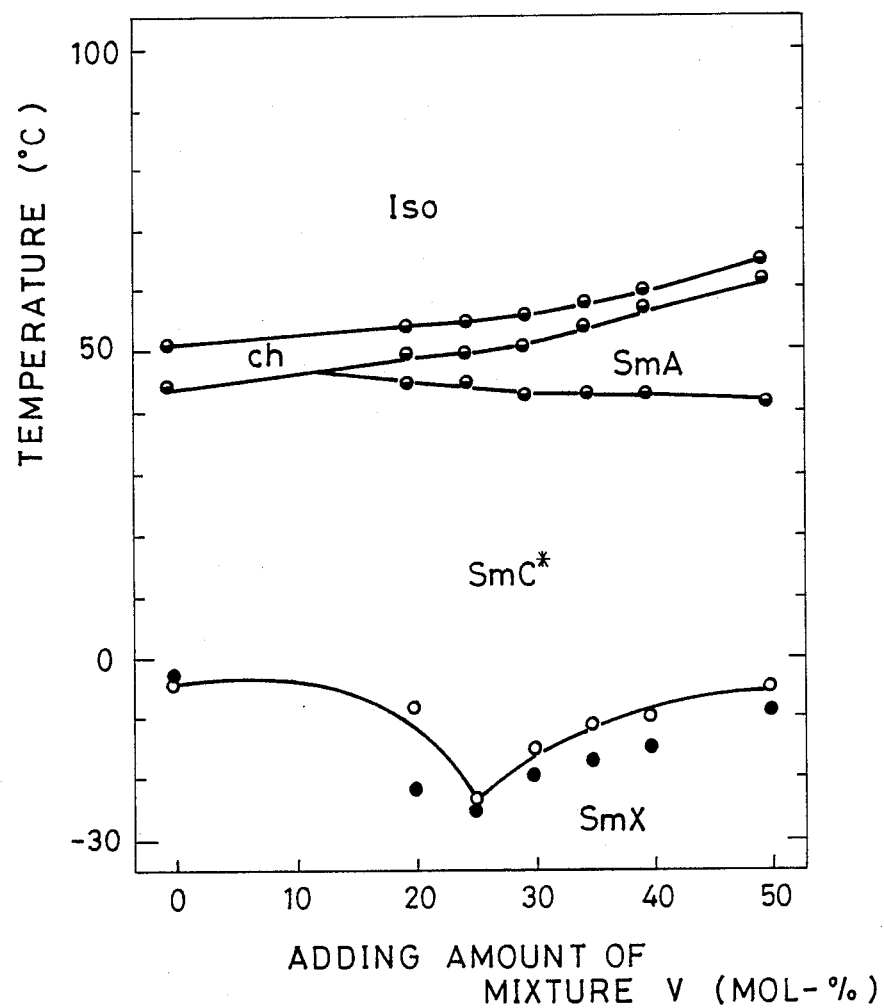
FIG. 4 is a phase diagram showing the relationship between the transfer temperature and the mixture ratio of a liquid crystal composition of another embodiment 2 of the invention.
Figure 5:
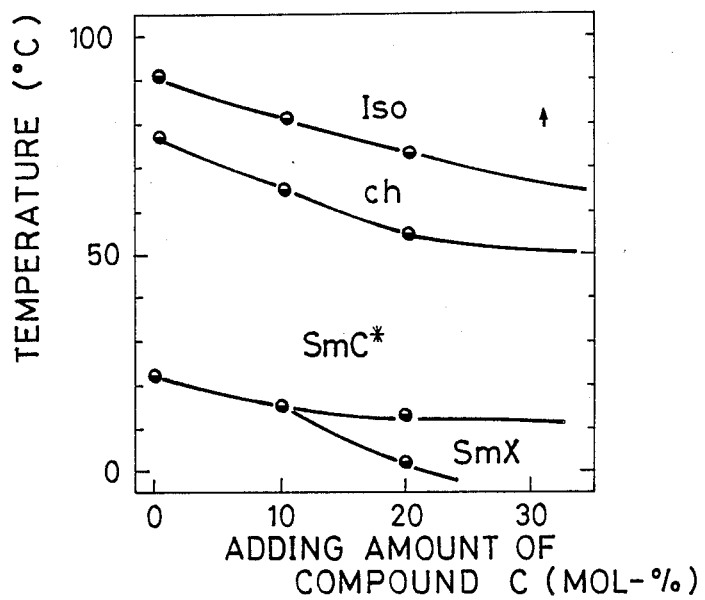
FIGS. 5 to 7 are phase diagrams showing the relationships between the transfer temperatures and the mixture ratios of conventional liquid crystal compositions.
Figure 6:
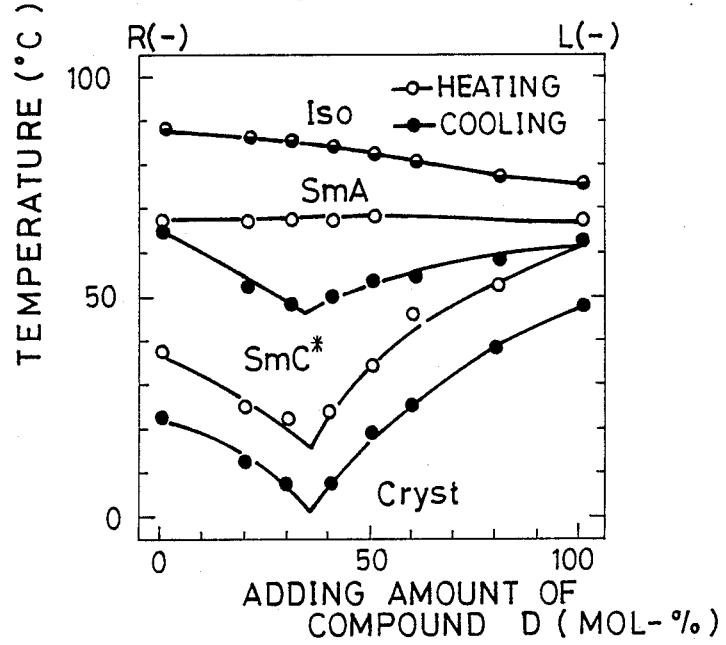
Figure 7:
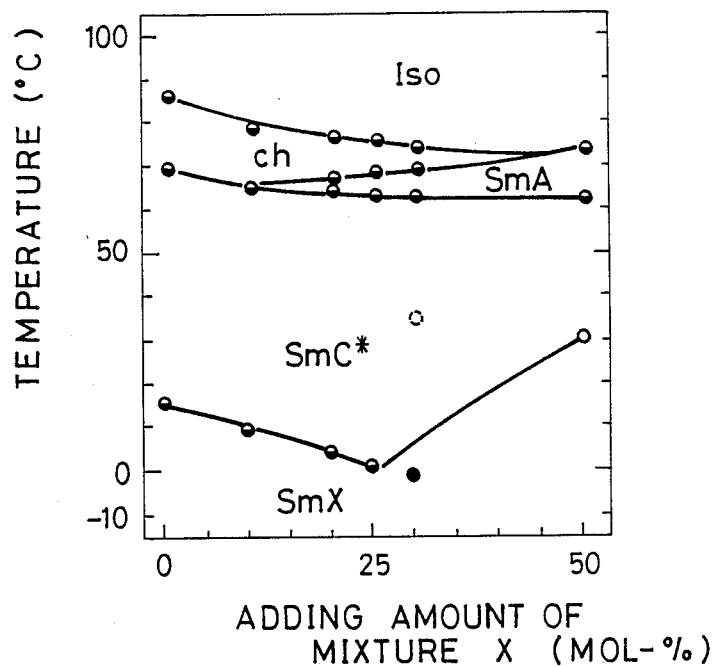

A mixture W were prepared by mixing the compounds F, G and B at a mixture ratio of F:G:B=30:40:30 (molar ratio). Simultaneously, a mixture V mixed with compounds H, J, K and L represented by the following formulae (H), (J), (K) and (L) at the ratio of H:J:K:L =31.5:31.5:37:10 (molar ratio) was prepared. Then, the mixtures V and W were mixed to prepare a liquid crystal composition. When the relationship between the mixture ratio and the transfer temperature of the liquid crystal composition was examined, the results shown in FIG. 4 were obtained.

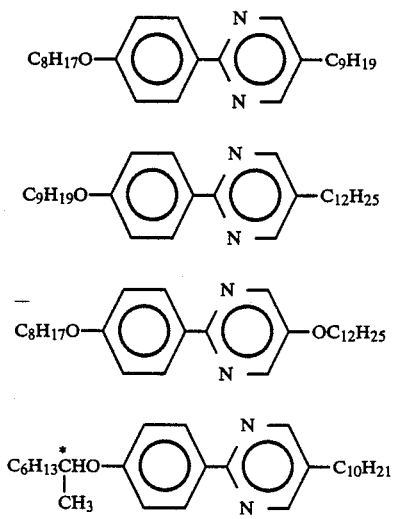

From the results, the temperature range of Sc* phase became −25 to +45° C. when approx. 25 mole-% of the mixture V was added, and it was understood that the lower limiting temperature of Sc* phase of the liquid crystal composition was extremely low which has not been observed in the prior art.

When the liquid crystal composition to which 25% of the mixture V was added was sealed in a cell similarly to the Example 1 and examined, bistability can be performed even with the liquid crystal composition, and it was confirmed that high velocity responsiveness could be obtained.

EXAMPLE 3

A liquid crystal composition different from the liquid crystal composition of the Example 1 was prepared. Compounds M, N and O represented by the following formulae (M), (N) and (O) were mixed instead of the compound F as the compound I. Similar experiments to those of the Example 1 were conducted.

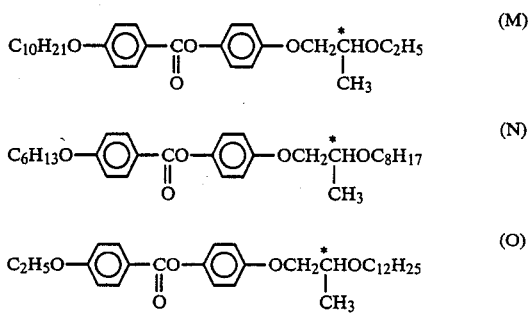

As a result, even when any of the compounds M, N and O were used, the temperature range of the Sc* phase could be reduced by adding the compound G as the compound II similarly to the case of the Example 1.

The compositions to which any of the compounds M, N and O was added exhibited preferable orientation and responsiveness.

EXAMPLE 4

A liquid crystal composition different from the liquid crystal composition of the Example 1 was prepared. Compounds P, Q and S represented by the following formulae (P), (Q) and (S) were mixed instead of the compound G as the compound II. Similar experiments to those of the Example 1 were conducted.

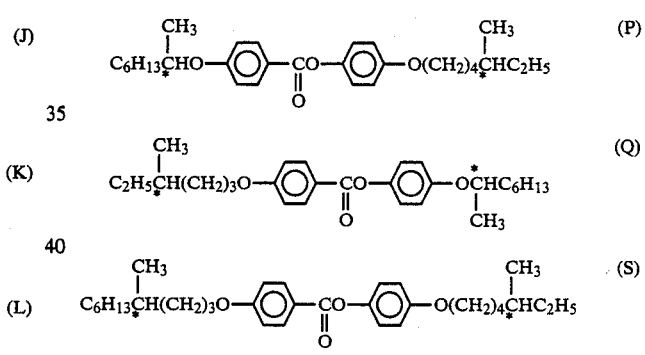

As a result, even when any of the compounds P, Q and S were used, the temperature range of the Sc* phase could be reduced by adding the compound F as the compound I similarly to the case of the Example 1.

The compositions to which any of the compounds P, Q and S was added exhibited preferable orientation and responsiveness.

As described above, the liquid crystal of the present invention is mixed at least with the compound represented by the general formula (I) and the compound represented by the general formula (II), thereby reducing the temperature range of the Sc* phase.

According to the present invention, the ferrodielectric liquid crystal composition having preferable orientation and responsiveness, and the lower limiting temperature of Sc* phase presented at room temperature and especially lower temperatures can be provided.

What is claimed is:

1. A liquid crystal composition comprising at least a compound I represented by the following general formula (I), a compound II represented by the following general formula (II), and a compound IV represented by the following general formula (IV):

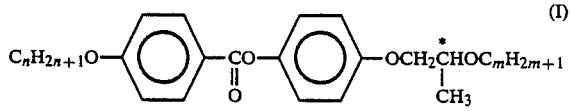   (I)

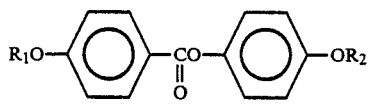   (II)

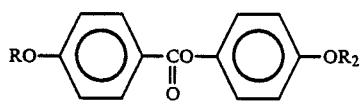   (IV)

wherein n is $2 \leq n \leq 12$, m is $2 \leq m \leq 12$, R is an alkyl group having no asymmetric (chiral) carbon structure and, $R_1$ and $R_2$ are alkyl groups each having an asymmetric (chiral) carbon structure, said $R_1$ being a different alkyl group with respect to $R_2$, said $R_1$ inducing spiral twisting in an opposite direction to that induced by said $R_2$, said $R_1$ inducing spontaneous polarization in a direction identical to that induced by said $R_2$, said direction of spiral twisting and said direction of spontaneous polarization being defined by said $R_1$ and said $R_2$ in a compound III represented by the following general formula (III):

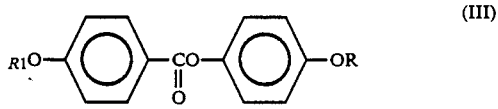   (III)

and said compound IV, respectively.

2. A liquid crystal composition according to claim 1 wherein said $R_1$ is:

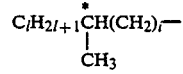

and said $R_2$ is:

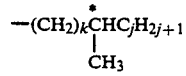

and l is $2 \leq l \leq 6$, j is $2 \leq j \leq 6$, i is $0 \leq i \leq 4$, k is $0 \leq k \leq 4$ and $i \neq k$.

* * * * *